United States Patent
Adachi et al.

(10) Patent No.: US 7,359,691 B2
(45) Date of Patent: Apr. 15, 2008

(54) HIGH FREQUENCY INTERFERENCE-CUT FILTER CIRCUIT

(75) Inventors: Kenji Adachi, Nagoya (JP); Takashi Umeda, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 481 days.

(21) Appl. No.: 11/081,586

(22) Filed: Mar. 17, 2005

(65) Prior Publication Data
US 2005/0227662 A1    Oct. 13, 2005

(30) Foreign Application Priority Data
Apr. 13, 2004    (JP)    ............... 2004-117601

(51) Int. Cl.
*H04B 1/06* (2006.01)
(52) U.S. Cl. ..................................... 455/266; 455/340
(58) Field of Classification Search ............... 455/63.1, 455/78, 82, 83, 114.1, 114.2, 266, 339, 340, 455/280
See application file for complete search history.

(56) References Cited

U.S. PATENT DOCUMENTS

| | | | |
|---|---|---|---|
| 6,070,062 A * | 5/2000 | Yoshida et al. | 455/234.1 |
| 7,061,993 B2 * | 6/2006 | Wieck | 375/316 |
| 7,158,768 B2 * | 1/2007 | Woo et al. | 455/179.1 |
| 2004/0018824 A1 * | 1/2004 | Fang | 455/302 |
| 2004/0248531 A1 * | 12/2004 | Takaki | 455/131 |
| 2005/0215204 A1 * | 9/2005 | Wallace et al. | 455/78 |

FOREIGN PATENT DOCUMENTS

JP    2000-013357 A    1/2000

* cited by examiner

*Primary Examiner*—Nguyen T. Vo
(74) *Attorney, Agent, or Firm*—McDermott Will & Emery LLP

(57) ABSTRACT

Disclosed is a high frequency apparatus which eliminates an influence of interfering signals. An interference-cut filter (24) for eliminating interfering signals is disposed between an input terminal (22) and a mixer (27). The interference-cut filter (24) is so controlled that it effectively demonstrates the function while the interfering signals are transmitted. Control of the interference-cut filter (24) is made by a switch (23), which is controlled by a selector switch controller (39), and the switch controller (39) is controlled responsive to an error correction counter (38) and a radio wave transmitted from a cellular telephone (40). This structure eliminates interference attributable to communication signals transmitted by the cellular telephone (40) and undesirable signals entering from the outside. The invention can thus realize high quality reception.

8 Claims, 4 Drawing Sheets

HIGH FREQUENCY INTERFERENCE-CUT FILTER CIRCUIT

TECHNICAL FIELD

The present invention relates to a high frequency apparatus used for receiving ground waves and satellite waves of digital and analog broadcasting. More specifically, the invention relates to the high frequency apparatus capable of suppressing and eliminating adverse influences of interfering signals attributable to other broadcasting signals in frequencies adjacent to the original frequency band of which reception is sought.

BACKGROUND ART

FIG. 4 shows an example of a high frequency apparatus of the prior art. That is, the conventional high frequency apparatus 100 comprises input terminal 2 in connection to antenna 1, and input filter 3 connected to input terminal 2. Apparatus 100 also comprises AGC amplifier 4 connected to an output of input filter 3 and provided with an AGC control terminal, tuning filter 5 connected to an output of AGC amplifier 4, mixer 6 having one of input ports connected with an output of tuning filter 5, and intermediate frequency filter 7 connected to an output of mixer 6. Apparatus 100 further comprises intermediate frequency amplifier 8 connected to an output of intermediate frequency filter 7, and demodulator 9 connected to an output of intermediate frequency amplifier 8.

Furthermore, apparatus 100 comprises error correction circuit 10 connected to an output of demodulator 9, output terminal 11 connected to an output of error correction circuit 10, AGC voltage detector circuit 12 connected between an output of mixer 6 and the AGC control terminal of AGC amplifier 4, and local oscillator 13 connected to the other input port of mixer 6.

Moreover, apparatus 100 comprises PLL circuit 14 connected into a loop circuit with local oscillator 13, an output side of PLL circuit 14 connected to a tuning input terminal of tuning filter 5, and crystal resonator 15 connected to another input port of PLL circuit 14.

Cellular telephone 16 equipped with antenna 16a is installed in high frequency apparatus 100. Error correction circuit 10 comprises a serially connected unit of Viterbi decoding circuit 10a and Reed-Solomon encoding circuit 10b.

High frequency apparatus 100 constructed as above operates in a manner which is described hereinafter. High frequency digital signals input to antenna 1 are fed to tuning filter 5 where a desired wave to be received is tuned and selected. The selected wave is mixed with an output of local oscillator 13 by mixer 6, and an intermediate frequency wave is output from the output side of intermediate frequency amplifier 8. This intermediate frequency wave is demodulated by demodulator 9, and output from output terminal 11 after subjected to error correction by error correction circuit 10.

The prior art technique pertaining to this invention is disclosed, for example, in Japanese Patent Unexamined Publication, No. 2000-13357.

However, when conversation is made by using cellular telephone 16 installed in such conventional high frequency apparatus 100, the communication signal of cellular telephone 16 is transmitted from antenna 16a. When this occurs, the communication signal output from cellular telephone 16 is received in antenna 1. Therefore, if the signal received in antenna 1 has a frequency adjacent to the frequency band of the desired wave being received, the communication signal (i.e., the transmission signal) output from cellular telephone 16 becomes an interfering signal, and this gives rise to a problem that it makes difficult for apparatus 100 to receive the originally desired signals.

Accordingly, the present invention is to provide a high frequency apparatus that eliminates the problem attributable to undesirable interfering signals such as the above.

SUMMARY OF THE INVENTION

A high frequency apparatus of the present invention comprises an interference-cut filter disposed between an input terminal and a mixer. This structure is intended to optimize a function of the interference-cut filter at least when there is transmission of interfering signals, and to avoid the problem of undesired interfering signals form causing an adverse effect to the normal transmission signals.

The high frequency apparatus of this invention is provided with the input terminal for receiving a desired high frequency signal of a given frequency band, the mixer having an input port for receiving the signal input from the input terminal and another input port in connection to an output side of a local oscillator, an output terminal for delivering an output of the mixer, and the interference-cut filter disposed between the input terminal and the mixer for removing the interfering signals.

The interference-cut filter disposed between the input terminal and the mixer for removing the interfering signals is controlled in a manner that it operates when the interfering signals are transmitted. That is, the interference-cut filter is so controlled that it demonstrates the function while the interfering signals are transmitted. In other words, this invention has an advantage of excluding a drawback associated with insertion of the interference-cut filter and achieving high quality of reception, since it can cut off operation (or, function) of the interference-cut filter when there is no emission or output of interfering signals.

DETAILED DESCRIPTION OF THE INVENTION

Referring to the accompanying drawings, description is provided hereinafter of the preferred embodiments of this invention.

First Embodiment

Figure 1:
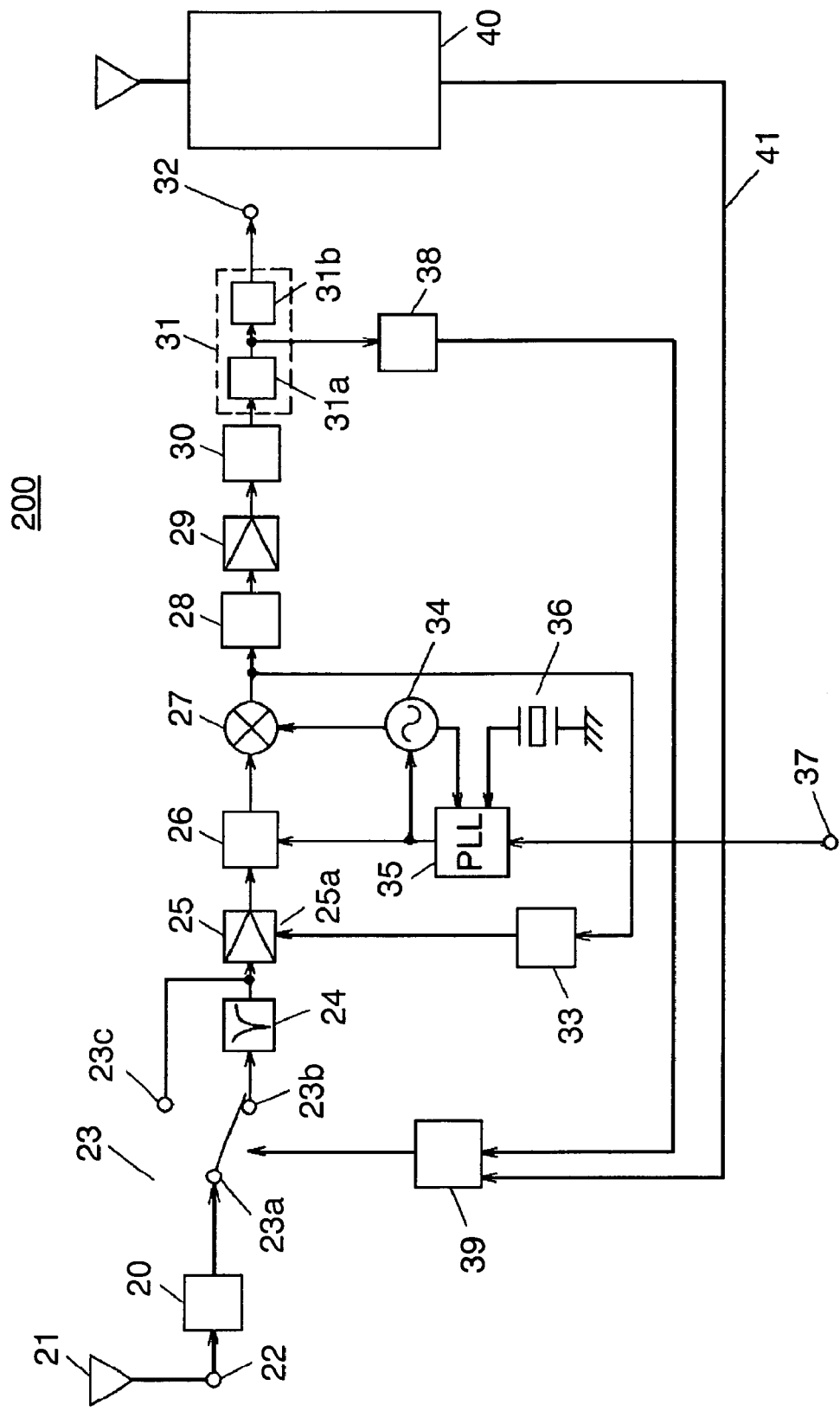
FIG. 1 shows a block diagram of a high frequency apparatus according to a first exemplary embodiment of the present invention.

FIG. 1 is a block diagram of high frequency apparatus 200 according to the first embodiment of this invention. High frequency apparatus 200 of the first embodiment is suitable for removing interfering signals anticipated in advance as being exist in a given frequency band. This is based on a concept that the frequency band of undesirable signals output and transmitted by a cellular telephone is either known or foreseeable when, for instance, the cellular telephone is built in and mounted to high frequency apparatus 200.

In FIG. 1, high frequency apparatus 200 comprises input terminal 22 connected to antenna 21, and input filter 20 connected to input terminal 22. Apparatus 200 also comprises selector switch 23 having common terminal 23a in connection to an output of input filter 20, and interference-cut filter 24 connected to one side terminal 23b of selector switch 23 for the purpose of removing interfering signals. Apparatus 200 also comprises AGC amplifier 25 for receiving an output of interference-cut filter 24 as well as a signal from the other side terminal 23c of selector switch 23, the AGC amplifier 25 having AGC control terminal 25a. Also provided are tuning filter 26 connected to an output of AGC amplifier 25, and mixer 27 having input ports, one of which is in connection with an output side of tuning filter 26.

High frequency apparatus 200 also comprises intermediate frequency filter 28 connected to an output of mixer 27 and intermediate frequency amplifier 29 connected to an output of intermediate frequency filter 28. Apparatus 200 further comprises demodulator 30 connected to an output of intermediate frequency amplifier 29, Vitarbi decoding circuit 31a connected to an output of demodulator 30, Reed-Solomon encoding circuit 31b connected to an output of Vitarbi decoding circuit 31a, output terminal 32 connected to an output of Reed-Solomon encoding circuit 31b, and AGC voltage detector circuit 33 connected between an output of mixer 27 and AGC control terminal 25a of AGC amplifier 25.

Furthermore, high frequency apparatus 200 comprises local oscillator 34 connected to the other one of the input ports of mixer 27, PLL circuit 35 connected into a loop circuit with local oscillator 34, an output of PLL circuit 35 connected to a tuning input terminal of tuning filter 26, and crystal resonator 36 connected to another input port of PLL circuit 35.

Moreover, apparatus 200 comprises data input terminal 37 connected to PLL circuit 35, error correction signal counter 38 connected to an output of Vitarbi decoding circuit 31a, and selector switch controller 39 in connection with an output of error correction signal counter 38 for the purpose of controlling selector switch 23.

High frequency apparatus 200 of this invention is equipped with cellular telephone 40, and transmission detection signal 41 of this cellular telephone 40 is input also to selector switch controller 39. Vitarbi decoding circuit 31a and Reed-Solomon encoding circuit 31b constitute error correction circuit 31. Here, interference-cut filter 24 may be provided between tuning filter 26 and mixer 27. According to this configuration, the NF performance can be improved even further since AGC amplifier 25 is placed in the front stage of interference-cut filter 24.

High frequency apparatus 200 constructed as above operates in a manner which is described hereinafter. High frequency digital signals input to antenna 21 are subjected to rough tuning by input filter 20. An output of input filter 20 is fed to common terminal 23a of selector switch 23 comprised of, for instance, an electronic circuit.

In this embodiment here, selector switch 23 is set to contact with one side terminal 23b when signals of a frequency being received, or the desired radio waves, include a comparatively large level of interfering signals, so that the high frequency signals input through antenna 21 are fed to AGC amplifier 25 via interference-cut filter 24.

On the other hand, selector switch 23 is set to contact with the other terminal 23c when the transmitted signals do not include interfering signals or the transmitted signals include interfering signals that are correctable with error correction circuit 31, so that the high frequency signals input through antenna 21 is fed directly to AGC amplifier 25.

After an output of AGC amplifier 25 is tuned and a desired receiving station is selected with tuning filter 26, it is mixed with an output of local oscillator 34 by mixer 27 to output signals of the intermediate frequency. These intermediate frequency signals are fed to demodulator 30 by way of intermediate frequency filter 28 and intermediate frequency amplifier 29. Accordingly, the high frequency signals input through antenna 21 are demodulated by demodulator 30.

The output of mixer 27 is input at the same time to AGC voltage detector circuit 33, and an output of this AGC voltage detector circuit 33 is used to control an amplification factor of AGC amplifier 25. AGC amplifier 25 is thus controlled in a manner that signals of an excessive amplitude are not delivered to mixer 27. This circuit configuration reduces distortion of the signals produced by mixer 27.

The signals demodulated by demodulator 30 (i.e., baseband signals) are corrected by error correction circuit 31, and the error-corrected signals are then output from output terminal 32. This error correction circuit 31 comprises Vitarbi decoding circuit 31a and Reed-Solomon encoding circuit 31b, and it can correct errors if an error ratio of the signals output from Vitarbi decoding circuit 31a has a value equal to or smaller than $2 \times 10^{-4}$ (this figure is hereinafter referred to as a correctable error range).

Accordingly, error correction counter 38 counts a number of error corrections output from Vitarbi decoding circuit 31a, and selector switch controller 39 sets selector switch 23 to make contact with one side terminal 23c when the counted number is within the correctable error range. In this case, the high frequency signals input from antenna 21 do not pass through interference-cut filter 24, and thereby realizing high quality of the reception without getting any influence of the interference-cut filter 24.

On the other hand, selector switch controller 39 sets selector switch 23 to make contact with the other side terminal 23b when the number of error corrections output from Vitarbi decoding circuit 31a exceeds the correctable error range. As a result, the high frequency signals input from antenna 21 pass through interference-cut filter 24. Since this allows interference-cut filter 24 to remove interfering signals, a frequency of errors is reduced, thereby making possible for error correction circuit 31 to carry out its error correcting function.

In addition, selector switch controller 39 can switch the connection of selector switch 23 as appropriate by using an output of error correction counter 38 and transmission detection signal 41 while the signal is being transmitted from cellular telephone 40 equipped in high frequency apparatus 200.

Therefore, this enables apparatus 200 to ensure the reception of error-corrected signals even when cellular telephone 40 is transmitting radio waves. It also realizes high quality reception without getting adverse influences of interference-cut filter 24 since the high frequency signals do not pass through interference-cut filter 24 when there is no output of transmission detection signal 41 from cellular telephone 40.

When a transmission frequency of cellular telephone 40 is 800 MHz (fixed), for instance, a center frequency of interference-cut filter 24 is set to be 800 MHz. On the other hand, the center frequency of interference-cut filter 24 is set to 1,500 MHz (fixed) if, for example, the transmission frequency of cellular telephone 40 is 1,500 MHz.

Since interference-cut filter 24 for removing interfering signals is disposed between input terminal 22 and mixer 27, as described above, it can prevent the interfering signals from being input to mixer 27. This embodiment can thus provide the high frequency apparatus practically no trouble even if it receives regular signals including interfering signals.

The control of interference-cut filter 24 becomes effective when there is transmission of interfering signals. In other words, the practical function of interference-cut filter 24 is turned off when there is no output of the interfering signals. That is, the function of interference-cut filter 24 is disabled. As a result, this embodiment realizes high quality reception since it can shut off the adverse effect attributable to interference-cut filter 24.

In the case of receiving digital broadcasting signals, however, it is not necessary to activate the function of interference-cut filter 24 even when interfering signals are transmitted and the error ratio is within the correctable error range of error correction circuit 31. In other words, the function of interference-cut filter 24 need not be activated. In this way, a high quality of reception becomes possible because it can exclude unpredictable adverse effects of interference-cut filter 24 regardless of whether such effects take place.

In this apparatus, PLL circuit 35 is controlled according to a data input from tuning data input terminal 37 in a manner to adjust an oscillation frequency of local oscillator 34 and a center frequency of tuning filter 26 so as to receive radio waves of the desired broadcasting station.

Second Embodiment

Figure 2:
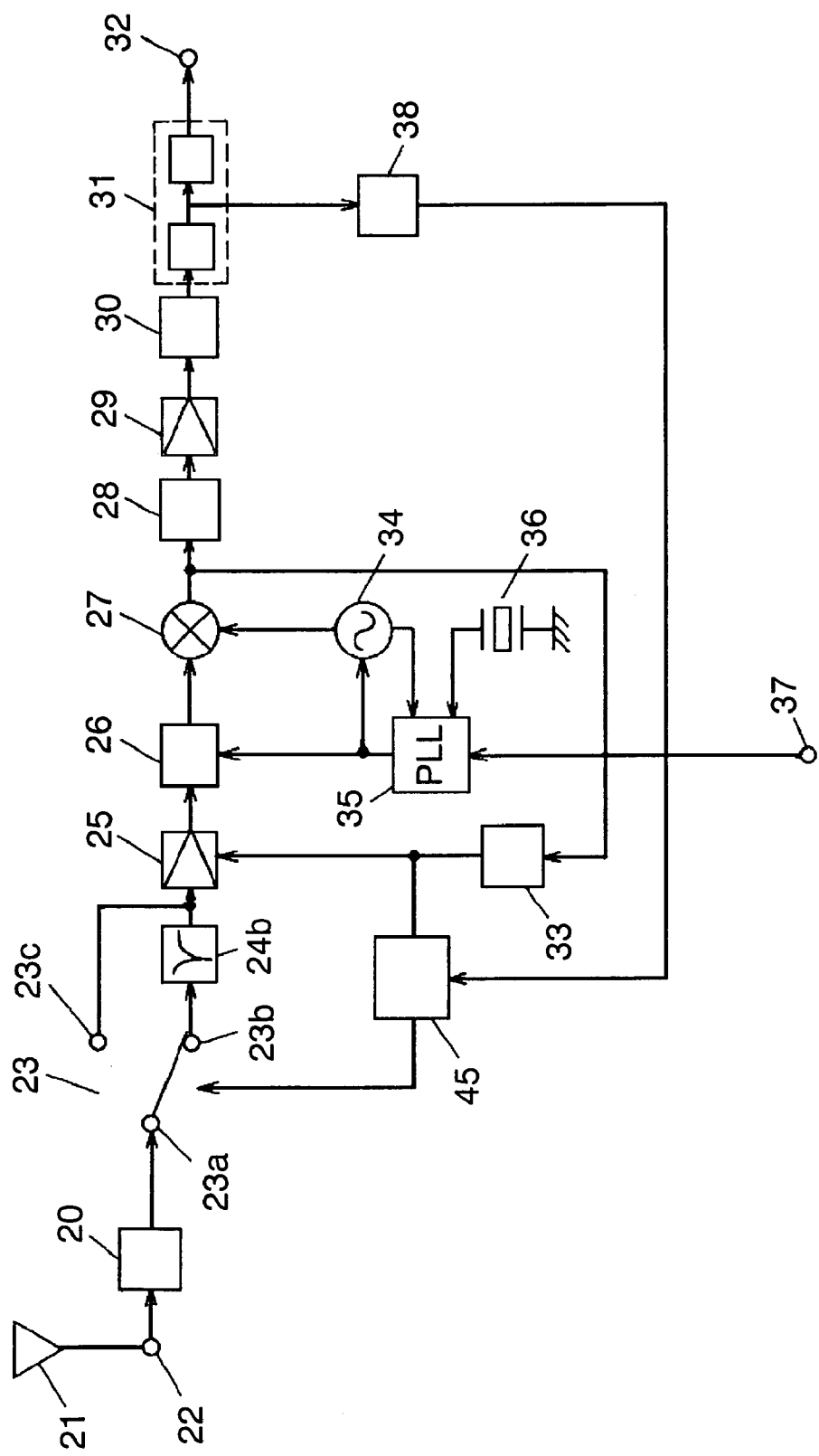
FIG. 2 shows a block diagram of a high frequency apparatus according to a second exemplary embodiment.

FIG. 2 is a block diagram of high frequency apparatus 200 according to the second embodiment of this invention. High frequency apparatus 200 described in this second embodiment is also intended to separate interfering signals of an anticipated frequency band, and to exclude them from the originally desired normal signals. One such example is the case in which analog broadcasting signals of 6 channel or 8 channel may exist as interfering signals when receiving digital broadcasting signals of the adjacent 7 channel.

In this instance, interference-cut filter 24b having a center frequency (any of 6 and 8 channels) is proved effective for the pre-determinate interference frequency (6 or 8 channels) input to antenna 21 from the outside.

The second embodiment is contrived to control selector switch 23 when there is a large input of interfering signals, and if the originally desired signals output from mixer 27 have a small amplitude. In the second embodiment, like reference marks are used to designate the like components as those of the first embodiment, and their descriptions will be abbreviated.

In the second embodiment, an output of AGC voltage detector circuit 33 and an output of error correction counter 38 are communicated to selector switch controller 45 in a manner to control selector switch 23 by using an output of the selector switch controller 45. In other words, selector switch 23 is turned to one side terminal 23b when the output of AGC voltage detector circuit 33 is within a predetermined voltage range and the output of error correction counter 38 is outside of the correctable error range. As a result, high frequency signals input from antenna 21 are led to pass through interference-cut filter 24b.

However, selector switch 23 is turned to other side terminal 23c so as not to lead the high frequency signals to pass through interference-cut filter 24b when the output of error correction counter 38 is within the correctable error range, even if the output of AGC voltage detector circuit 33 is within the predetermined voltage range.

In other words, interference-cut filter 24b need not be made effective when the output of error correction counter 38 is within the correctable error range. This embodiment can thus avoid an influence of interference-cut filter 24b, and make high quality reception possible.

Third Embodiment

Figure 3:
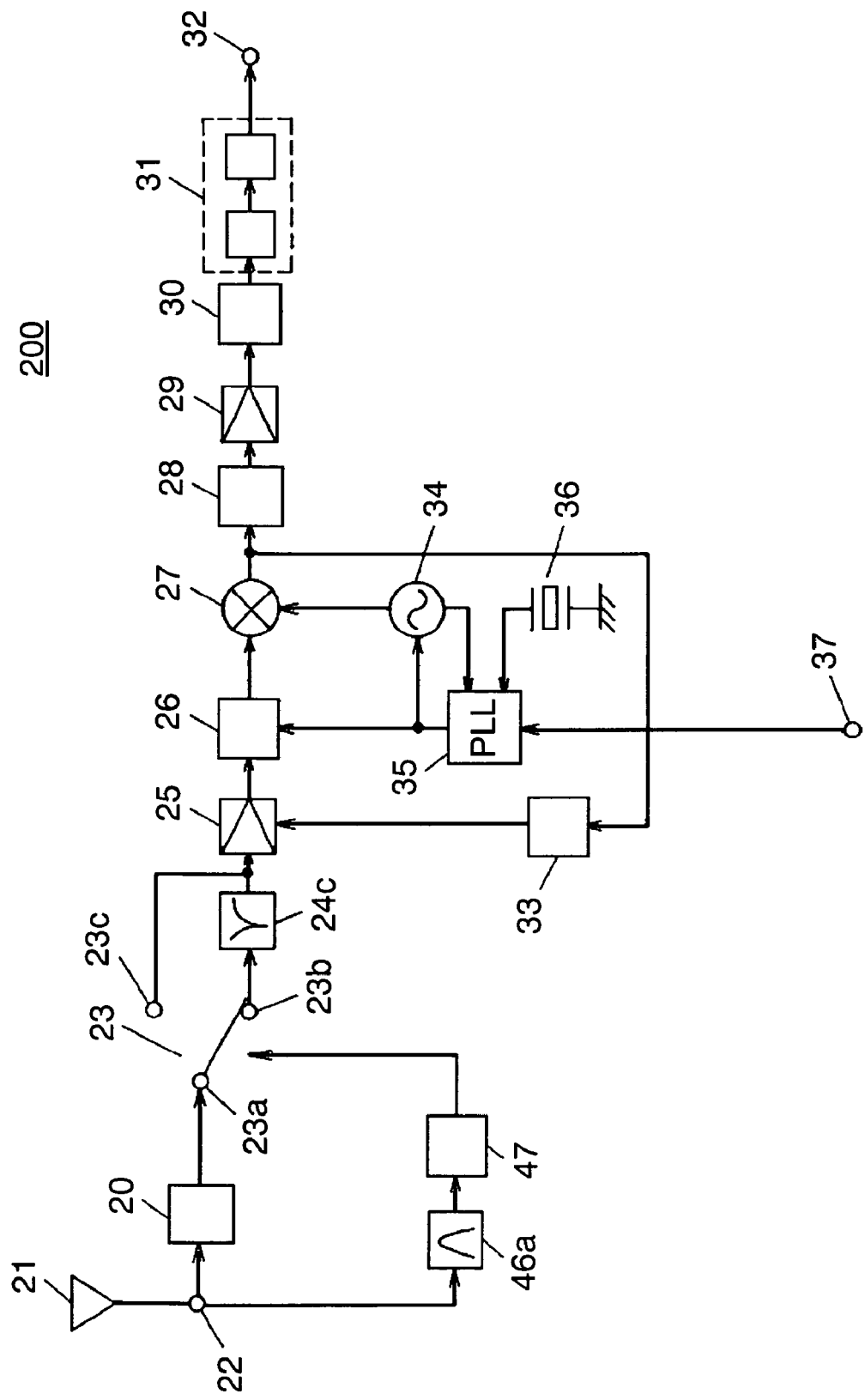
FIG. 3 shows a block diagram of a high frequency apparatus according to a third exemplary embodiment of this invention.
Figure 4:
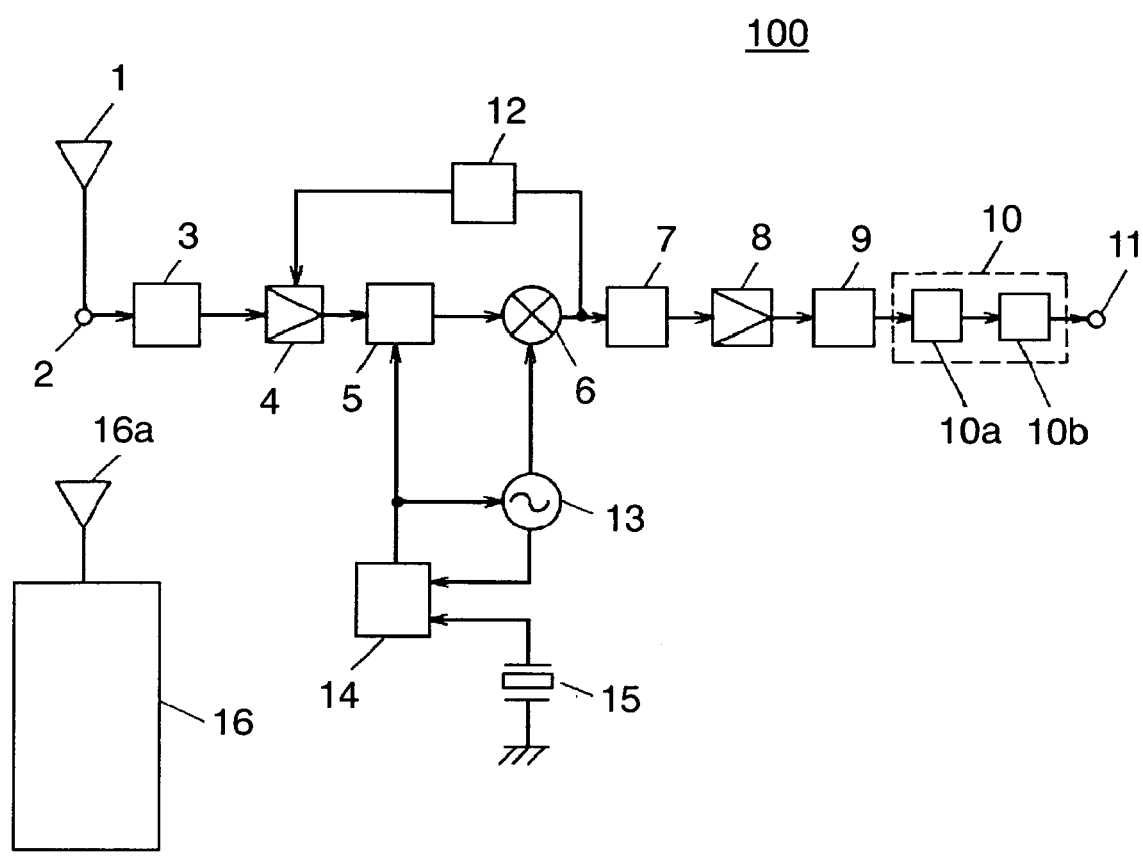
FIG. 4 shows a block diagram of a high frequency apparatus of the prior art.

FIG. 3 is a block diagram of high frequency apparatus 200 according to the third embodiment of this invention. High frequency apparatus 200 of this third embodiment is also proved effective when interfering signals exist in an anticipated frequency band. One such example is the case in which there is a manufactory and the like facility in the vicinity of a location where high frequency apparatus 200 of this invention is used, and emission of interfering signals is anticipated from there. Moreover, this embodiment is particularly effective when a frequency band of the interfering signals is known or foreseeable. Like reference marks are used to designate the like components as those of the first and second embodiments, and their descriptions will be abbreviated.

In FIG. 3, interference-pass filter 46a for passing interference frequency is connected to input terminal 22, and interfering signal detector 47 is connected between an output of interference-pass filter 46a and a control terminal of selector switch 23. A center frequency of this interference-pass filter 46a is set to be generally equal to a center frequency of interference-cut filter 24c. Or, interference-pass filter 46a and interference-cut filter 24c may be so designed that their center frequencies are continuously variable in a synchronized manner. Alternatively, when frequency bands of interfering signals are foreseeable, interference-pass filters 46a and interference-cut filters 24c may be prepared in numbers corresponding to these frequency bands, so that they can be switched on and off.

In high frequency apparatus 200 of this invention constructed as above, high frequency signals input through antenna 21 include undesirable interfering signals. Interference signal detector 47 detects a value of the interfering signals, and turns selector switch 23 to one side terminal 23b if the value exceeds a predetermined level.

According to this structure, the undesirable interfering signals received from antenna 21 are separated and removed from the normal transmission signals by interference-cut filter 24c. The apparatus can thus receive digital broadcasting signals without errors. In this structure, demodulator 30 and error correction circuit 31 are not required if the apparatus is used only for reception of analog broadcasting signals.

In this third embodiment, the apparatus is provided with demodulator 30, error correction circuit 31 and error correction counter 38 in the same manner as the second embodiment. However, selector switch 23 need not be turned to terminal 23b side to lead the high frequency signals to pass through interference-cut filter 24c, when an output of error correction counter 38 is within the correctable error range, even if an output of interfering signal detector 47 is larger than the predetermined voltage. This embodiment can thus avoid an influence of interference-cut filter 24c, and make high quality reception possible.

In any of high frequency apparatuses 200 of the first through the third embodiments, a C/N detector circuit may be provided in error correction circuit 31, so that interference-cut filter 24 is controlled by using a C/N detection signal output by this C/N detector circuit, and this can also provide a similar advantageous effect. Here, the C/N denotes a ratio of a carrier level of receiving signal in relation to a level of surrounding noise.

In high frequency apparatuses 200 of the first through the third embodiments, what have been illustrated are examples wherein high frequency apparatuses 200 are designed for reception of digital broadcasting signals. However, these high frequency apparatuses 200 are also adaptable for reception of analog broadcasting signals. When adapted for reception of analog broadcasting signals, high frequency apparatus 200 is required to incorporate a C/N detector circuit in place of error correction circuit 31 to control interference-cut filter 24 by using a signal output from the C/N detector circuit.

INDUSTRIAL APPLICABILITY

The high frequency apparatus of the present invention is capable of suppressing and excluding adverse influences of interfering signals. The invention thus has high industrial applicability since it can provide the high frequency apparatus with a capability of properly eliminating interfering signals even if they exist in the regular high frequency signals.

What is claimed is:

1. A high frequency apparatus comprising:
an input terminal for receiving a high frequency signal;
a mixer having an input port for receiving the signal fed through the input terminal, and another input port in connection to an output of a local oscillator;
an output terminal for delivering an output of the mixer;
an interference-cut filter disposed between the input terminal and the mixer for removing an interfering signal included in the high frequency signal;
a demodulator and an error correction circuit disposed in this order between the mixer and the output terminal; and
an AGC voltage detector circuit in connection to an output of the mixer,
wherein the interference-cut filter is controlled when an interfering signal is transmitted,
wherein the interference-cut filter is controlled when a value of error correction signal output by the error correction circuit exceeds a predetermined value, and
wherein the interference-cut filter is controlled when an output of the AGC voltage detector circuit is within a predetermined voltage range.

2. The high frequency apparatus of claim 1 further comprising a cellular telephone mounted thereto, wherein
an interference frequency of the interference-cut filter is set to match with a transmission frequency of the cellular telephone, and
the interference-cut filter is controlled at least when a radio wave is transmitted from the cellular telephone.

3. The high frequency apparatus of claim 1 further comprising an interference-pass filter connected to the input terminal for passing an interfering signal of same frequency as the interference-cut filter, and an interference signal detector in connection to an output of the interference-pass filter, wherein
the interference-cut filter is controlled when an output of the interference signal detector exceeds a predetermined value.

4. The high frequency apparatus of claim 3, wherein center frequencies of the interference-cut filter and the interference-pass filter are made variable continuously in a synchronized manner.

5. A high frequency apparatus comprising:
an input terminal for receiving a high frequency signal;
a mixer having an input port for receiving the signal fed through the input terminal, and another input port in connection to an output of a local oscillator;
an output terminal for delivering an output of the mixer;
an interference-cut filter disposed between the input terminal and the mixer for removing an interfering signal included in the high frequency signal;
a demodulator and an error correction circuit disposed in this order between the mixer and the output terminal; and
an AGC voltage detector circuit in connection to an output of the mixer,
wherein the interference-cut filter is controlled, when a value of error correction signal output by the error correction circuit exceeds a predetermined value and an output of the AGC voltage detector circuit is within a predetermined voltage range.

6. The high frequency apparatus of claim 5 further comprising a cellular telephone mounted thereto, wherein
an interference frequency of the interference-cut filter is set to match with a transmission frequency of the cellular telephone, and
the interference-cut filter is controlled at least when a radio wave is transmitted from the cellular telephone.

7. The high frequency apparatus of claim 5 further comprising an interference-pass filter connected to the input terminal for passing an interfering signal of same frequency as the interference-cut filter, and an interference signal detector in connection to an output of the interference-pass filter, wherein
the interference-cut filter is controlled when an output of the interference signal detector exceeds a predetermined value.

8. The high frequency apparatus of claim 7, wherein center frequencies of the interference-cut filter and the interference-pass filter are made variable continuously in a synchronized manner.

* * * * *